United States Patent [19]

Banks

[11] Patent Number: 5,388,605
[45] Date of Patent: Feb. 14, 1995

[54] VIBRATION RESPONSIVE GAS SHUT-OFF VALVE ASSEMBLY

[76] Inventor: James A. Banks, 1827 W. 74th St., Los Angeles, Calif. 90047

[21] Appl. No.: 145,581

[22] Filed: Nov. 4, 1993

Related U.S. Application Data

[60] Division of Ser. No. 882,444, May 12, 1992, Pat. No. 5,351,706, which is a continuation-in-part of Ser. No. 804,012, Dec. 6, 1991, abandoned.

[51] Int. Cl.$^6$ .................................................. F16K 17/36
[52] U.S. Cl. ............................... 137/38; 137/45; 137/625.22
[58] Field of Search ................ 137/38, 39, 45, 625.22

[56] References Cited

U.S. PATENT DOCUMENTS

| | | | |
|---|---|---|---|
| 3,791,396 | 2/1974 | Nelson | 137/38 |
| 4,546,660 | 10/1985 | Bujold | 137/45 X |
| 4,821,759 | 4/1989 | Diamond | 137/45 |
| 5,050,629 | 9/1991 | Willoughby | 137/38 |

FOREIGN PATENT DOCUMENTS

| | | | |
|---|---|---|---|
| 589263 | 12/1933 | Germany | 137/625.22 |
| 109863 | 8/1980 | Japan | 137/45 |
| 150679 | 11/1981 | Japan | 137/45 |

*Primary Examiner*—Robert G. Nilson
*Attorney, Agent, or Firm*—Robert J. Schaap

[57] ABSTRACT

A vibration responsive gas shut-off valve assembly which is highly effective in conditions which give rise to excessive vibration such as earthquakes and the like. The shut-off valve assembly is inserted into a gas line leading from a source of gas to an interior of a building such a dwelling structure. The valve assembly comprises a spherically shaped ball which may be located within the gas line and which contains a gas passage channel extending therethrough. When the Mall is in a first position, gas will flow from one side of the ball through the channel and to the other side of the ball in the gas line. When the ball is in a second position, the channel is located so that one side is vented through an orifice in the pipe and the other side is in communication with the downstream side of the pipe such that gas in the downstream side of the pipe leading to the building can be vented. A control mechanism is provided to cause the valve to remain in the normally open position but which trips in response to vibration and causes the ball to rotate thereby effectively closing the valve.

14 Claims, 3 Drawing Sheets

VIBRATION RESPONSIVE GAS SHUT-OFF VALVE ASSEMBLY

RELATED APPLICATION

This application is a division of U.S. patent application Ser. No. 882,444, filed May 12, 1992, for "Vibration Responsive Gas Shut-Off Valve Assembly", now U.S. Pat. No. 5,351,706 and which is, in turn, a continuation-in-part of U.S. patent application Ser. No. 804,012, filed Dec. 6, 1991, for "Vibration Responsive Gas Shut-Off Valve Assembly" and which is now abandoned.

BACKGROUND OF THE INVENTION

1. Field of the Invention

This invention relates in general to certain new and useful improvements in vibration responsive gas shut-off valves and more particularly to an improved valve assembly of the type stated which utilizes a spherical gas flow control ball located within a gas conduit and which rotates to permit closure of the valve in response to excessive vibration.

2. Brief Description of the Prior Art

In many parts of the United States and for that matter, in many parts of the world where the possibility of earthquakes is large, there is a need for a highly effective, relatively inexpensive vibration responsive gas shut-off valve. One of the main causes of fire in the aftermath of an earthquake is the rupture of a gas line. There are usually several ignitable sources which can cause the ignition of the gas flowing from a ruptured gas line. In many cases, the damage caused by the resultant fire can be as severe as the damage caused by the earthquake itself.

There have been numerous prior art proposals for vibration responsive, gas shut-off valves which would operate in earthquake conditions to shut-off a valve. However, in most cases, these valves are unduly complex and thereby result in substantial cost to manufacture as well as a resultant cost to purchase. Due to the high cost of purchasing these valves, homeowners and apartment owners are reluctant to invest in the purchase of these valves. As a result, there are only a very limited number of gas shut-off valves in areas which have a high earthquake potential.

Further militating against the purchase of gas shut-off valves is the complexity and cost both in the installation and in the operation. Not only is the valve itself expensive to purchase, but its installation can often times be a cost in excess of the valve cost itself. Further, the average user requires a relatively simple valve so that it is easy to turn on in the event that the valve trips from a condition of vibration or other external condition. Heretofore, there was no highly effective user-friendly earthquake responsive valve or other vibration responsive valve. The present invention solves this problem by providing such an effective vibration responsive valve.

OBJECTS OF THE INVENTION

It is, therefore, one of the primary objects of the present invention to provide a gas shut-off valve assembly which is vibration responsive and will automatically shut-off the flow in a gas lines when a vibration exceeds a certain predetermined level.

It is another object of the present invention to provide a vibration responsive gas shut-off valve assembly of the type stated which can be inserted in a main gas line thereby providing for a relatively low cost installation.

It is a further object of the present invention to provide a vibration responsive gas shut-off valve assembly of the type stated which can be manufactured at a relatively low cost and which is therefore highly susceptible to wide-spread use, particularly in earthquake prone areas.

It is an additional object of the present invention to provide a vibration responsive gas shut-off valve assembly of the type stated which is easy to operate and thereby does not militate against its use and installation.

It is another salient object of the present invention to provide a vibration responsive gas shut-off valve assembly of the type stated which can be used in a large number of different sizes and types of gas lines.

With the above and other objects in view, my invention resides in the novel features of form, construction, arrangement and combination of parts presently described and set forth in the claims.

BRIEF SUMMARY OF THE DISCLOSURE

This invention relates in general terms to a vibration responsive gas shut-off valve assembly and more particularly to an earthquake responsive valve assembly. The vibration responsive valve assembly of the invention is adapted to be inserted into an existing gas line or it can be constructed as a unit for connection to a gas line. In this case, the vibration responsive valve is one which responds to a level of vibration exceeding a predetermined level for closing the valve. The valve can then be actuated for opening the same by manual intervention.

The vibration responsive gas shut-off valve assembly of the present invention generally comprises a gas flow control ball which is generally spherical and is located in a gas delivering pipe. This flow control element has a diameter approximately equal to the inner diameter of the gas delivery conduit. When located in the conduit, the flow control element forms an upstream side and a downstream side. The upstream side with respect to the gas flow control element is the side containing or receiving the source or supply of gas. The downstream side would be that side containing the end use of the gas, such as in a dwelling structure.

The gas flow control element is locatable within the conduit and movable from a gas open flow position to a gas closed flow position. In the gas closed flow position, no gas will flow from the upstream side to the downstream side. In the open flow position there will be a flow of gas through a duct in the flow control element.

The duct in the flow control element is arranged so that the gas will flow through the duct from the upstream side to the downstream side when the element is normally in the gas open flow position. However, when the element is rotated to the gas closed flow position, that is in response to vibration exceeding a threshold level, the flow control element is rotated such that the duct will not permit a gas flow from the upstream side to the downstream side. The duct is also arranged so that when the gas flow control element is in the gas closed flow position, a vent occurs from the downstream side through a vent opening in the conduit. This vent opening is normally closed by the flow control element when the flow control element is in the gas open flow position.

In one embodiment of the invention, the duct is arranged and has a configuration such that there are two legs with one of the legs being angularly located with respect to the other of the legs at an obtuse angle. In another embodiment, there is a third leg which constitutes a vent leg and which will be aligned with a vent opening when the gas flow control element is in the gas closed flow position.

A mechanical actuating mechanism is associated with the gas flow control element. This flow control element, which is in the nature of a spherical ball, is mounted on a shaft, the latter projecting through the gas flow conduit. The mechanical actuating structure is such that the gas flow control element is held in the open flow position. However, a spring is operatively connected to the shaft such that when vibration exceeds a predetermined level, the spherical element will rotate to the gas closed flow position by the bias of the spring.

In one embodiment of the invention, the spring is a torsion spring coiled about the shaft. In another embodiment of the invention, the spring is either a tension spring or a compression spring which is connected to a mechanical member also in operative connection to the shaft holding the spherical element. Various embodiments of the mechanical actuating mechanism are disclosed herein. However, each effectively accomplished the same result in that they are provided for rotating the valve ball to enable gas shut-off and gas flow operation.

This invention possesses many other advantages and has other purposes which will become more fully apparent from a consideration of the forms in which it may be embodied. A few practical embodiments of the forms are illustrated in the drawings and described in the following detailed description. However, it should be understood that these drawings and the detailed description are set forth only for purposes of illustrating the general principles of the invention and are not to be taken in a limiting sense.

BRIEF DESCRIPTION OF DRAWINGS

Figure 1:
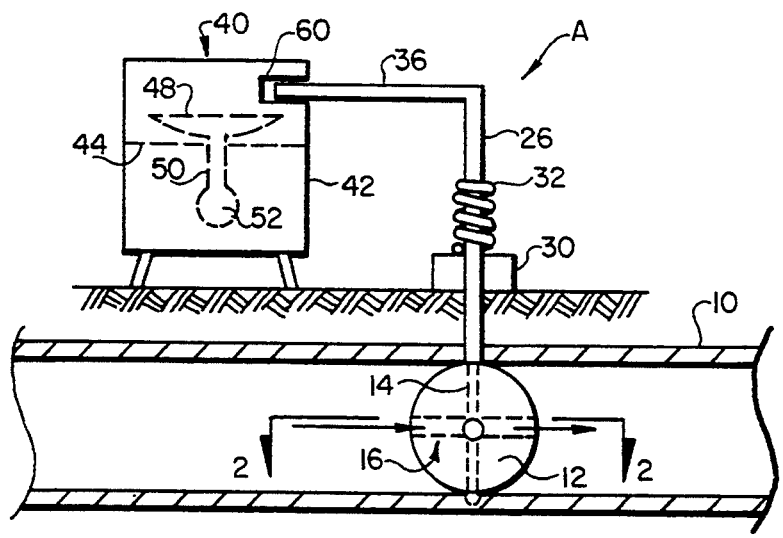
Figure 2:
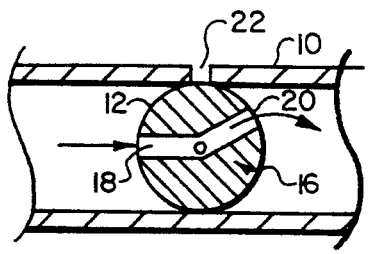
Figure 3:
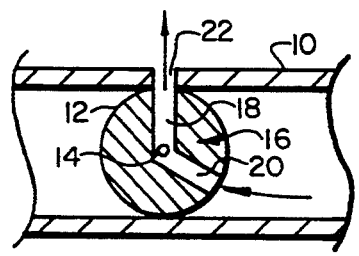
Figure 4:
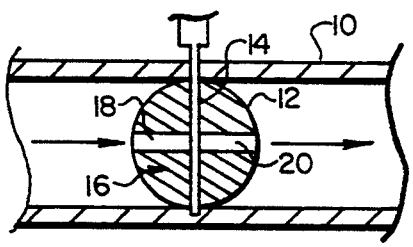
Figure 9:
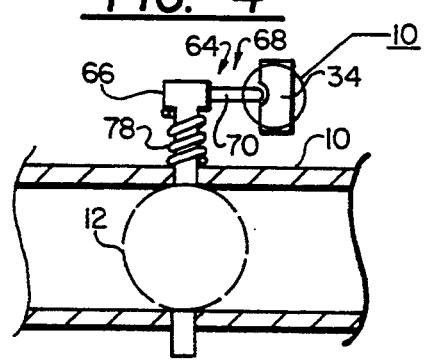
Figure 10:
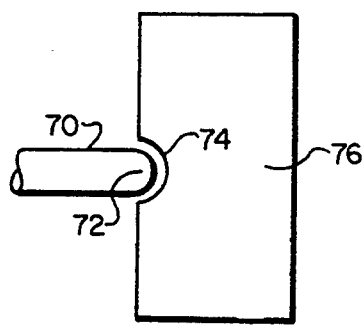
Figure 5:
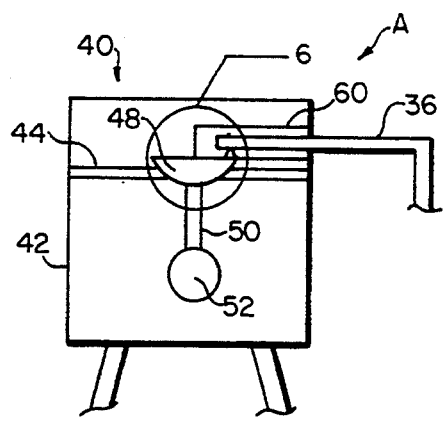
Figure 6:
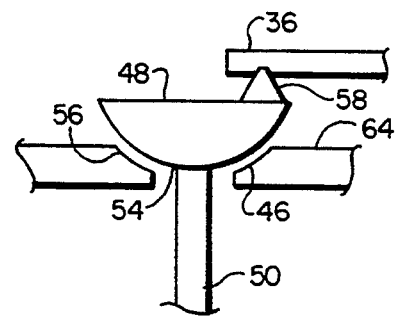
Figure 14:
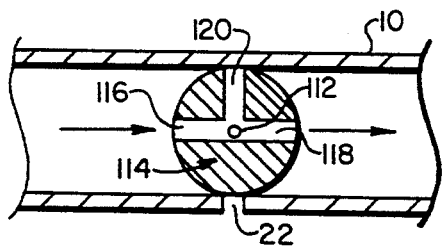
Figure 15:
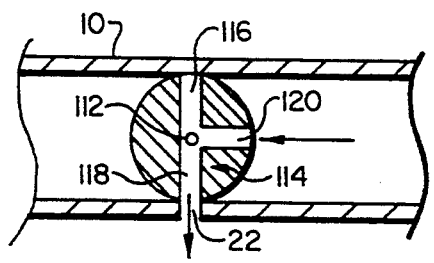
Figure 12:
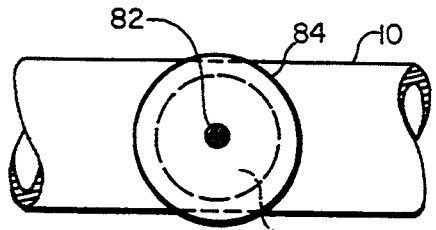
Figure 11:
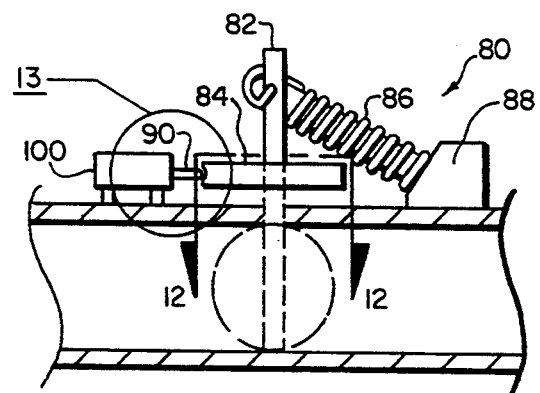
Figure 13:
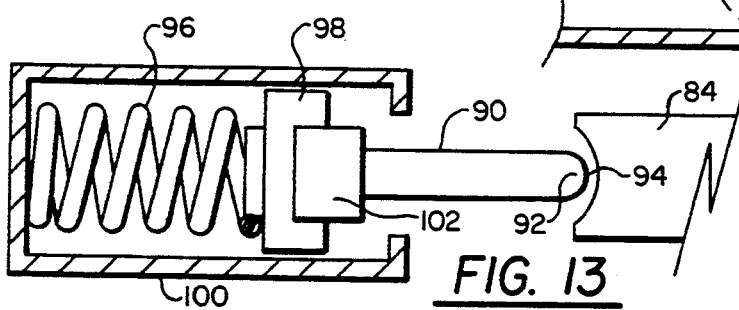
Figure 7:
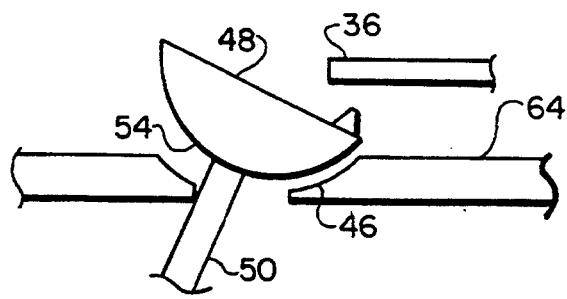
Figure 8:
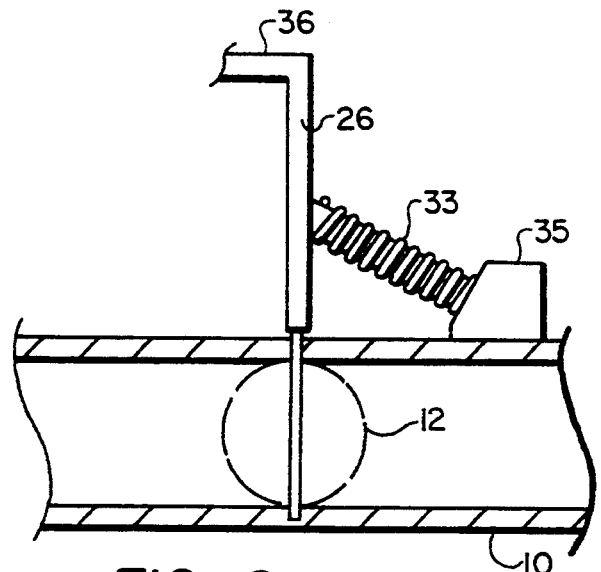
Figure 16:
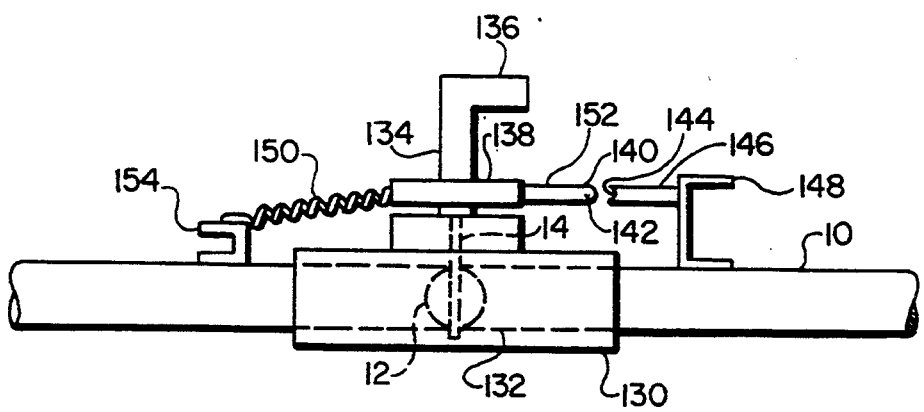

Having thus described the invention in general terms, reference will now be made to the accompanying drawings (three sheets) in which:

FIG. 1 is a side elevational view, partially in section, of a vibration responsive gas shut-off valve assembly constructed in accordance with and embodying the present invention;

FIG. 2 is a horizontal sectional view taken along line 2—2 of FIG. 1, and showing a ball valve arrangement in a gas-carrying conduit forming part of the gas shut-off valve assembly;

FIG. 3 is a horizontal sectional view, similar to FIG. 2, and showing the ball valve forming part of the gas-shut off valve assembly in an alternate non-flow, gas-venting position;

FIG. 4 is a vertical sectional view showing part of the gas shut-off valve assembly of the invention in a gas-flow position;

FIG. 5 is a somewhat schematic side elevational view, partially broken away, and showing a portion of a sensory mechanism forming part of a mechanical actuating assembly used with and forming part of the gas shut-off-valve assembly of the invention;

FIG. 6 is an enlarged side elevational view showing a pendulum structure forming part of the actuating mechanisms of FIG. 5;

FIG. 7 is a fragmentary side elevational view, somewhat similar to FIG. 6, and showing the head of the pendulum structure in a slightly different position and which also shows the position of the pendulum head in response to vibration exceeding a predetermined threshold level;

FIG. 8 is a side elevational view, partially broken away and in section, and showing a slightly different form of spring biasing arrangement forming part of the actuating mechanism;

FIG. 9 is a side elevational view, partially in section, and showing a modified form of actuating mechanism forming part of the gas shut-off valve assembly of the present invention;

FIG. 10 is a fragmentary elevational view showing in enlarged detail a portion of the actuating mechanism of FIG. 9, included in the circled portion designated as FIG. 10 appear in FIG. 9;

FIG. 11 is a side elevational view, partially in section, and showing another form of actuating mechanism used with and forming part of the gas shut-off valve assembly of the present invention;

FIG. 12 is a horizontal sectional view, taken substantially along line 12—12 of FIG. 11;

FIG. 13 is a side elevational view, partially in section, showing in enlarged detail, a portion of the actuating mechanism of FIGS. 11 and 12;

FIG. 14 is a horizontal sectional view showing an alternate valve ball arrangement forming part of the gas shut-off valve assembly of the present invention;

FIG. 15 is a horizontal sectional view, similar to FIG. 14, and showing the valve ball of FIG. 14 in a non-gas flow and gas-venting position; and FIG. 16 is a side elevational view of still another modified form of vibration responsive gas shut-off valve assembly constructed in accordance with and embodying the present invention.

DETAILED OF PREFERRED EMBODIMENTS

Referring now in more detail and by reference characters to the drawings which illustrate practical embodiments of the present invention, A designates a vibration responsive gas shut-off valve assembly constructed in accordance with and embodying the present invention. This gas shut off valve assembly is shown as being connected to a gas-carrying conduit 10. In this case, the conduit may be a separate unit which is installed in a gas-delivery type, or otherwise, the apparatus may be located within or mounted on or in connection with a conventional gas-delivery pipe.

The vibration-responsive gas shut-off valve assembly A of the present invention uses a spherical flow control element 12 which is often referred to as a valve ball. The ball 12 is mounted for rotation within the conduit by means of a pivot pin 14 which extends axially through the valve ball 12 and which pin 14 may be journaled on the cylindrical side wall of the conduit 10.

The valve ball 12 is provided with a gas flow duct 16 extending therethrough, as best illustrated in FIGS. 2-4 of the drawings. This duct 16 is provided with a first duct section or leg 18 and a second angularly located duct section or leg 20.

When the valve ball 12 is located in the position as shown in FIG. 2, the first duct section 18 is in communication with the upstream side of the gas conduit 10, that is, the gas supply side and more specifically, the left-hand side of the conduit in FIG. L. In like manner, the second conduit section 20 is in communication with the downstream side of the conduit, that is, the gas demand side. In actual operation, the downstream side of the conduit 10 would be connected to a utility which uses the gas as for example, a household facility or the like.

The upstream side or supply side would be connected to a source of gas under pressure.

By further reference to FIGS. 2 and 4, it can be observed that when the valve ball 12 is in the position as illustrated in FIGS. 1 and 2, gas will flow from the upstream side directly to the downstream side of the conduit, even though the two legs or ducts 18 and 20 are not necessarily in alignment in a plan view or horizontal sectional view. However, it can be observed by reference to FIG. 4 that the two legs 18 and 20 are in horizontal alignment in a plan view or horizontal sectional view. Thus, a complete gas flow occurs from the upstream side of the valve ball to the downstream side.

When the valve ball 12 is rotated by an actuating mechanism, to be hereinafter described, the valve ball 12 can assume the position as illustrated in FIG. 3 of the drawings. In this case, it can be observed that the valve ball will have rotated in a clockwise direction, reference being made to FIG. 3, so that the first leg 18 is in fluid communication with a vent opening 22 in the conduit 10. The second leg 20 is still in fluid communication with the downstream side of the valve. In this way, the downstream side of the gas conduit 10 will be vented to the external atmosphere so that there is no accumulation of gas within the downstream side in the event of a potential rupture of the downstream side. However, the upstream side will be sealed by virtue of the position of valve ball 12.

Usually, most fractures in the gas delivery system occur where the conduit is connected at a particular gas operating fixture. Thus, if the gas shut-off valve is located upstream of that connection to a facility, in the vast majority of the cases, any rupture will occur on the downstream side. The closing of the gas shut-off valve will thereby limit the possibility of secondary fires which might otherwise result.

By reference to FIGS. 2-4, it can be observed that the two ducts 18 and 20 are angularly located in such position that the duct 20 will always be in communication with the downstream side of the conduit 10. The first leg 18 will either be in communication with the upstream side or with the gas vent 22. Thus, the angle between the two duct sections 18 and 20 will always be an obtuse angle, that is greater than 90 degrees and usually about 135 degrees. However, the inclusive angle can range from about 110 degrees to about 150 degrees.

FIGS. 5 and 6 of the drawings illustrate one form of actuating mechanism which may be used in the gas shut-off valve assembly of the present invention. This actuating mechanism 24 comprises a shaft 26 which extends from or is connected to the pivot pin 14. The shaft 26 may be connected to a vibration sensing mechanism, as hereinafter described, for causing operation of the actuating mechanism. In the embodiment of the invention as illustrated in FIG. 1, the gas-carrying conduit 10 is located in a subterranean position. In this case, the entire valve ball portion would be located within the conduit itself. Either the pin 14 or otherwise, the shaft 26 will extend outwardly from the conduit 10 and above the ground surface, in the manner as best illustrated in FIG. 1.

The shaft 26 passes through a journal box 30 which may be located at a ground surface, in the manner as illustrated in FIG. 1 of the drawings. Moreover, a torsion spring 32 is wrapped about the shaft 26 and is secured to same as well as to the journal box 30. In this way, the torsion spring 32 will provide a torque or rotating force to the shaft 26 tending to bias the same to rotate it about its central longitudinal axis.

The shaft 26 is provided at its upper end with an integrally formed sensing arm 36 which extends into and cooperates with a vibration-sensing mechanism 40, which is also more fully illustrated in FIGS. 5 and 6 of the drawings. This vibration-sensing mechanism 40 comprises an outer housing 42 having a horizontally disposed plate 44 located within the interior surface thereof. The plate 44 is provided with a recess 46 on its upper surface for receiving the head 48 of a pendulum 50. This pendulum 50 may have a weight 52 at the lower end thereof, as illustrated in FIGS. 1 and 5 of the drawings.

It can be observed that the head 48 of the pendulum has a lower face 54 which essentially corresponds with the recess 46. Moreover, the recess 46 is constructed so that the pendulum will swing in the event that the housing 42 is subjected to vibration.

An upstanding projection 58 is formed on the upper surface of the pendulum head 48, as best illustrated in FIG. 6. Furthermore, it can be observed that the sensing arm 36 is contacted by the upstanding projection 58. As a result, the sensing arm 36 is precluded from being rotated and hence the shaft 6 is precluded from rotating about its central axis. In effect, the shaft 26 is biased by the spring 32 so as to rotate in a direction which would cause the sensing arm 36 to move outwardly from the housing 42 through an elongate slot 60 formed in the housing. However, this rotation is prevented by means of the projection 58.

When vibration exceeds a predetermined threshold level, the pendulum 50 will swing. If it swings sufficiently, the projection 58 will drop below the level of the sensing arm 36, permitting the shaft 26 to be biased about its central axis because of the biasing action of the spring 32. When the shaft rotates, as aforesaid, the pin 14, will rotate and therefore, the valve ball 12 will move to the closed flow position.

FIG. 8 also illustrates a slightly modified form of spring arrangement which may be used with the actuating mechanism of FIGS. 5 and 6 of the drawings. In this case, and in place of the torsion spring 32, a tension spring 33 may be connected to the shaft 26 at one end and with its opposite end connected to a fixed assembly block 35. The spring 33 would be attached to a side of the shaft 26 which is displaced from the block 35 and facing away from the assembly block 35 to provide the necessary torque to the shaft 26.

FIGS. 9 and 10 of the drawings illustrate another form of actuating mechanism 64 which may be used with and form part of the gas shut-off assembly of the present invention. This actuating mechanism 64 operates with a ball valve arrangement of the type previously described and comprises a shaft 66 which extends upwardly from and is connected to the pivot pin 14. The shaft 66 is also connected to a vibration-sensing mechanism 68, as hereinafter described in more detail, for causing operation of the actuating mechanism. Connected to the shaft 66 is a rocker arm 70 having a somewhat hemispherically shaped end 72 which fits within a corresponding hemispherically shaped recess 74 formed within a fixed plate 76. A torsion spring 78 is wound about the shaft 66 and tends to bias the shaft 66 to rotate in a direction which would cause a rotation of the valve ball 12. The valve ball 12 itself would operate in the manner as previously described and coact with the vent 22 and the upstream and downstream sides of the conduit 10, also in the manner as previously described.

If there is sufficient vibration as, for example, from an earthquake which exceeds a predetermined level, the end 72 of the rod 70 may be pushed outwardly, or at least to the edge, of the recess 74. The torsion spring 78 will cause a rotation of the shaft 66 and thereby cause a rotation of the pin 14 and hence the valve ball 12 in a manner as previously described. In this respect, the end 72 of the rod 70 and the corresponding hemispherically shaped recess 74 cooperate to function as a type of vibration-sensing mechanism. Only a tip end of the rod 70 slightly extends into the recess 74, as shown in FIG. 10. Further, there is a sufficient play and hence, slight radial movement of the shaft 66 with respect to its central axis, or otherwise slight movement of the plate 76, which can occur to allow the rod 70 to become displaced from the recess 74 when vibration exceeds a predetermined level. While the components are rigid, rough tolerances of the type found in plumbing construction exist here as well and vibrations beyond a predetermined level will allow displacement of the components. While this type of vibration-sensing mechanism is simple, it is nevertheless of a low-cost construction and will still operate to sense vibration exceeding a predetermined threshold level.

FIGS. 11-13 illustrate a further modified form of actuating and sensing mechanism 80 forming part of the vibration responsive gas shut-off valve assembly. In this embodiment, the valve ball 12 also may be rotatable about a vertical axis, as opposed to a horizontal axis in the same manner, as the previously described embodiments. The valve ball 12 is also mounted on a shaft 82 which is journaled in the conduit 10. Mounted on the shaft 82 adjacent to the exterior face of the conduit 10 is a rotatable disk which will rotate with the shaft 82. A tension spring 86 is secured to the shaft 82 and is also secured to the exterior face of the conduit 10 by means of a projection 88 mounted on the face of the conduit 10. In this way, the shaft 82 is maintained in a non-rotatable position by a vibration-sensing mechanism, as hereinafter described, but when moved from that fixed position, the spring 86 will cause a rotation of the shaft 82 and thereby cause a rotation of the valve ball 12. The spring 86 would be attached to a side of the shaft 82 displaced from the projection 46 and facing away from the projection 88 to provide the necessary torque to the shaft 82.

The plate 84 is maintained in a generally fixed position as shown in FIG. 11 and the gas valve is thereby held in an open flow position when vibration does not exceed a minimum predetermined threshold. A restraining pin 90 has a somewhat hemispherical end 92 which fits into a somewhat hemispherical recess 94 of the plate 84. The pin 90 is actually biased into engagement with the recess 94 by means of a compression spring 96 bearing against a shoe 98 at the end of the retaining pin 90. The compression spring 96 and the shoe 98, along with left-end of the retaining pin 90, are suitably retained within a cylinder-type housing 100 which also may be secured to the exterior face of the conduit 10. A vibration sensing mechanism, as illustrated in FIG. 12, will thereby hold the plate 84 in a fixed position and thereby hold the valve ball 12 in an open flow position when vibration does not exceed a minimum predetermined threshold level.

The shoe 98 may also be provided with a weight 102, as best illustrated in FIG. 13. The typical earthquake vibration often has components which may be substantial in a horizontal direction and include, for example, a back and forth shifting movement. If the vibration exceeds a predetermined threshold level, the weight 102 itself may be forced in a direction against the action of the compression spring 96 and push the pin 90 as to the left, reference being made to FIG. 13. As this occurs, the end 92 of the pin 90 will be removed from the recess 94 thereby allowing the plate 84 to rotate. In this respect, only one jolt sufficient to cause a shifting movement of the weight 102, and hence the pin 90, will permit the plate 84 to rotate before the compression spring 96 can allow a return of the pin 90 to its position as shown in FIG. 13. At that point, the recess 94 will have rotated to a position out of alignment with the pin 92. Rotation of the plate 94 will also cause a rotation of the shaft 82, and hence a rotation of the valve ball 12 in the manner as previously described.

The present invention has shown several highly effective actuating mechanisms which may be used with the vibration gas-responsive gas shut-off valve assembly. Other actuating mechanisms within the spirit of this invention could be employed. However, it should be understood that while any actuating mechanism which will rotate the valve ball 12 may be employed, these are illustrated and described herein are the most preferred of those known.

FIGS. 14 and 15 illustrate a modified form of ball valve arrangement which utilizes a different embodiment of a valve ball 110. The valve ball 110 is still located within a conduit 10 and which also has vent opening 22. The valve ball 110 is mounted within and is rotatable within the conduit 10 by means of a pivot pin 112 which extends through the valve ball 110. The pivot pin is similarly journaled in the wall of the conduit 10. The valve ball 110 would thereby rotate about a vertical axis so that in the arrangement, as illustrated in FIGS. 14, and 15, the sectional view as shown is that of a horizontal sectional view and the vent opening 22 would be located on the side of the conduit.

The valve ball 110 is provided with a first duct 114 which extends directly through the valve ball from upstream side to the downstream side. The duct 114 includes a first leg section 116 and a second leg section 118. However, the leg sections 116 and 118 are axially aligned so that there is a straight through fluid gas flow from the upstream side of the conduit to the downstream side. A third leg 120 intersects the duct 114 at its midpoint, as best illustrated in FIGS. 14 and 15 of the drawings. This latter duct 120 is designed to serve as part of a vent system to allow a venting of the downstream side of the conduit 10.

When the valve ball is in the open-flow position, it will assume that position, as illustrated in FIG. 14 of the drawings. When vibration exceeds a minimum predetermined threshold level, the valve ball will rotate through the operation of the actuating mechanism, to the position as illustrated in FIG. 15 of the drawings. As this occurs, it can be observed that there is no flow from the upstream side of the conduit to the downstream side. In fact, there is a complete venting of the downstream side in the arrangement as illustrated in FIG. 15.

FIG. 16 illustrates still a further modified form of actuating mechanism which may be used with the and form part of the vibration responsive gas shut-off valve assembly of the present invention. In this case, it can be observed that the valve assembly comprises a fitting 130 which is disposed within a conduit 10. Further, a ball valve 12 is similarly located within a gas passageway 132 of the fitting 130 which is aligned with the central bores of each side of the conduit. The valve ball 12 is similarly retained on a pivot pin 14.

A shaft 134 is secured to the upper end of the pivot pin 14 and is provided at its outer end with an angularly struck handle 136 for reasons which will presently more fully appear. A disk 138 is similarly mounted on the shaft 134 and is rotatable with the shaft 134 and hence the pivot pin 14. The disk 138 has an outwardly struck arm 140 having a hemispherically shaped tip end 142. This end 142 is designed to extend into a similarly and opposite hemispherically shaped recessed 144 of a pin 146. By reference to FIG. 16, it can be observed that the pin 146 is welded to or otherwise rigidly secured to a bracket 148 mounted on the exterior conduit 10.

The hemispherically shaped tip end 142 cooperates with the hemispherically shaped recess 144 of the pin in the manner as previously described in connection with the embodiment of the invention, as illustrated in FIGS. 9 and 10. The shaft 134 is biased to rotate about its longitudinal axis in a manner as hereinafter described. Hence, if contact between the recess 142 and the end 144 is interrupted, the arm 140 will rotate with the shaft 134 out of alignment with the pin 146.

When there is a vibration exceeding a predetermined threshold level, there may be sufficient separation and a gap existing between the pin 146 and the hemispherical-recess 142. Here again there is sufficient rough tolerance between the components in FIG. 16, much in the same manner as between the components of FIGS. 9 and 10, as previously described. Thus, displacement of the components will occur as vibration exceeds a predetermined level. As this occurs, the shaft 134 will be permitted to rotate. A tension spring 150 is connected to the arm 140 at a point 152, as illustrated in FIG. 16. This spring 150 is also secured to a bracket 154 which may be welded or otherwise rigidly secured to the exterior surface of the conduit in the manner as illustrated in FIG. 16. In accordance with this arrangement, it can be observed that the tension spring 150 will cause a pulling of the arm 140 and hence cause a rotation of the shaft 134. The frictional contact of the end 144 of the pin 146 with the hemispherically shaped recess 142 will be sufficient to restrain the shaft 134 against rotation. However, when separation does exist, as previously described, the shaft 134 will be permitted to rotate. The handle 136 is provided to enable the valve mechanism to be reset to the position as illustrated in FIG. 16.

Thus, there has been illustrated and described a unique and novel vibration-responsive gas shut-off valve assembly which is capable of automatically shutting off in the event that vibration exceeds a minimum predetermined level and which operates simply with a spherical valve ball. The present invention, therefore, fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A vibration responsive gas shut-off valve which is operable to shut off gas flow through a gas line in response to a vibration imposed on the line which exceeds a predetermined threshold level, said valve comprising:
    a) a somewhat spherical gas flow control element located in a gas conduit and having a diameter approximately equal to the inner diameter of the conduit and forming an upstream side of the conduit on the gas supply side of the element and a downstream side of the conduit on the opposite side of the element;
    b) means forming a duct having a first leg and a second leg extending through said element providing gas communication from the upstream side of the element to the downstream side of the element with respect to the conduit, said duct having the first leg of said duct extending from a surface of the flow control element to a point at the approximate center thereof and communicating with said second leg at the approximate center, said second leg being in direct axial alignment with and co-parallel with the first leg and also extending outwardly to the surface of the flow control element, said first and second legs having substantially the same diameter and being so arranged with an orientation and shape such that when the element is in a gas open flow position the gas from the upstream side will flow through the duct from the upstream side to the downstream side and provide a source of gas to a user thereof, said element being rotatable in said conduit to a gas closed flow position where the duct is arranged so there is no gas flow from the upstream side to the downstream side, said duct having a third leg which intersects said first and second legs at approximately the center of the flow control element, said third leg having approximately the same diametral size as each of the first and second legs and also extending outwardly to a surface of the flow control element;
    c) a pin extending through said flow control element and being journaled in a wall of the conduit to enable rotatable movement of said flow control element;
    d) a vent in said conduit located to be in communication with said third leg of said duct for venting the downstream side of the conduit through the duct when the element is in the gas closed flow position; and
    e) means responsive to a vibration exceeding a predetermined threshold level to move the element from a gas open flow position to a gas closed flow position.

2. The vibration responsive gas shut-off valve of claim 1 further characterized in that the means responsive to vibration comprises a mechanical mechanism holding the flow control element in the gas open flow position, and a spring means which causes automatic rotation of the element to the gas closed flow position in response to a sensing of a vibration exceeding a predetermined threshold level.

3. The vibration responsive gas shut-off valve of claim 2 further characterized in that the mechanical mechanism comprises a pendulum which swings in response to vibration and an arm which can become displaced with respect to the pendulum when vibration exceeds a predetermined threshold level.

4. The vibration responsive gas shut-off valve of claim 1 further characterized in that said first and second legs are aligned and coaxial to one another and said third leg is generally perpendicularly located with respect to said first and second legs.

5. The vibration responsive gas shut-off valve of claim 1 further characterized in that the means responsive to vibration comprises a shaft extending through said element and a disc on said shaft located externally of said conduit, and an elongated spring connected to said shaft.

6. The vibration responsive gas shut-off valve of claim 1 further characterized in that the means responsive to vibration comprises a shaft extending through said element and a torsion spring extending about said shaft.

7. A vibration responsive gas shut-off valve which is operable to shut off gas flow through a gas line in response to a vibration imposed on the line which exceeds a predetermined threshold level, said valve comprising:
a) a somewhat spherical gas flow control element located in a gas conduit and having a diameter approximately equal to the inner diameter of the conduit and forming an upstream side of the conduit on the gas supply side of the element and a downstream side of the conduit on the opposite side of the element;
b) means forming a duct extending through said element providing gas communication from the upstream side of the element to the downstream side of the element with respect to the conduit, said duct having an orientation and shape such that when the element is in a gas open flow position the gas from the upstream side will flow through the duct from the upstream side to the downstream side and provide a source of gas to a user thereof, said element being rotatable in said conduit to a gas closed flow position where the duct is arranged so there is no gas flow from the upstream side to the downstream side;
c) a vent in said conduit located to be in communication with a portion of said duct for venting the downstream side of the conduit through the duct when the element is in the gas closed flow position;
d) a shaft extending through said gas line and rotating with said flow control element;
e) spring means manually urging and causing automatic rotation of said shaft and said flow control element to the gas closed flow position in response to sensing of vibration exceeding a predetermined threshold level;
f) a pendulum capable of swinging movement in response to vibration and preventing said shaft from rotating when vibration does not exceed a predetermined threshold level;
g) an offset arm operatively connected to said shaft and being rotatable with said shaft and flow control element and also being coupled to said pendulum;
h) a coupling member on said pendulum engaging said offset arm causing an offset arm and hence said pendulum to be coupled to said shaft, said coupling member blocking rotation of the offset arm and the shaft when the vibration does not exceed the predetermined level, but said coupling member becoming displaced with respect to said offset arm and causing the offset arm to be uncoupled from the pendulum when vibration does exceed the predetermined level thereby allowing the arm and shaft and flow control element to rotate to the gas closed flow position.

8. The vibration responsive gas shut-off valve of claim 7 further characterized in that said member comprises an upstanding element on said pendulum which is in operative engagement with the arm until vibration exceeds the predetermined threshold level.

9. The vibration responsive gas shut-off valve of claim 7 further characterized in that said pendulum comprises a pendulum head which has an arcuately bottom surface and which rides in a structure having a well with an arcuately shaped upper surface generally conforming to the bottom surface of said pendulum head.

10. A vibration responsive gas shut-off valve which is operable to shut off gas flow through a gas line in response to a vibration imposed on the line and the valve which exceeds a predetermined threshold level, said valve comprising:
a) a gas flow control element located in a gas delivery conduit and being rotatable in the conduit from an open flow position where it permits gas flow to a closed flow position where it blocks gas flow;
b) vent means associated with said flow control element and with a vent opening in said conduit for venting a downstream side of said conduit when the flow control element is in the closed position;
c) a shaft extending through said conduit and being connected to said flow control element for rotating same;
d) spring means operatively connected to said shaft to normally bias said shaft to rotate the flow control element to the closed flow position;
e) a pendulum capable of swinging movement in response to vibration and preventing said shaft from rotating when vibration does not exceed a predetermined threshold level; and
f) an offset arm operatively connected to said shaft and being rotatable with said shaft and flow control element and also being coupled to said pendulum;
g) an upstanding coupling element on said pendulum and being associated with said offset arm and being in engagement with said offset arm thereby causing said offset arm and hence said pendulum to be coupled to said shaft until vibration exceeds a predetermined threshold level, said coupling means being effective to preclude rotation of the offset arm and the shaft when the vibration does not exceed a predetermined level but causing the offset arm to be uncoupled from the pendulum when vibration does exceed the predetermined level thereby enabling the arm and shaft and flow control element to rotate to the gas closed flow position.

11. The vibration responsive gas shut-off valve of claim 10 further characterized in that said flow control element is a somewhat spherical gas flow control element located in the gas conduit and having a duct extending therethrough, said duct having a diameter approximately equal to the inner diameter of the conduit and forming an upstream side of the conduit on the gas supply side of the element and a downstream side of the conduit on the opposite side of the element.

12. The vibration responsive gas shut-off valve of claim 11 further characterized in that said duct extends through said element providing gas communication from the upstream side of the element to the downstream side of the element with respect to the conduit, said duct having an orientation and shape such that when the element is in a gas open flow position the gas from the upstream side will flow through the duct from the upstream side to the downstream side and provide a source of gas to a user thereof, said element being rotatable in said conduit to a gas closed flow position where the duct is arranged so there is no gas flow from the upstream side to the downstream side.

13. The vibration responsive gas shut-off valve of claim 10 further characterized in that said pendulum comprises a pendulum head which has an arcuately shaped bottom surface and which rides in a structure having a well with an arcuately shaped upper surface generally conforming to the bottom surface of said pendulum head.

14. The vibration responsive gas shut-off valve of claim 10 further characterized in that the pendulum swings in response to vibration and the upstanding element on said pendulum initially engages said offset arm and blocks rotation of said shaft, said upstanding element becoming displaced with respect to the offset arm when vibration exceeds a predetermined threshold level, thereby allowing the arm and shaft and flow control element to rotate to the closed flow position.

* * * * *